(12) United States Patent
Schiller et al.

(10) Patent No.: US 9,144,956 B2
(45) Date of Patent: *Sep. 29, 2015

(54) BEAD FOAM COMPRESSION MOLDING METHOD WITH IN SITU STEAM GENERATION FOR LOW DENSITY PRODUCT

(71) Applicant: NIKE, Inc., Beaverton, OR (US)

(72) Inventors: Denis Schiller, Vancouver, WA (US); Sui-Chieh J. Yu, Portland, OR (US); Hossein A. Baghdadi, Taichung (TW)

(73) Assignee: NIKE, Inc., Beaverton, OR (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/765,273

(22) Filed: Feb. 12, 2013

(65) Prior Publication Data

US 2014/0227505 A1 Aug. 14, 2014

(51) Int. Cl.
*B29C 44/04* (2006.01)
*B32B 5/24* (2006.01)
(Continued)

(52) U.S. Cl.
CPC ............ *B32B 5/245* (2013.01); *A43B 13/04* (2013.01); *A43B 17/14* (2013.01); *A43B 23/0215* (2013.01); *B29C 35/049* (2013.01); *B29D 35/122* (2013.01); *C08J 9/232* (2013.01); *B29K 2021/003* (2013.01); *B29K 2075/00* (2013.01); *C08J 2205/06* (2013.01); *C08J 2205/10* (2013.01); *C08J 2300/22* (2013.01); *C08J 2300/26* (2013.01); *C08J 2375/04* (2013.01); *Y10T 428/249953* (2015.04)

(58) Field of Classification Search
CPC ............ B29C 44/0453; B29C 44/0461; B29C 44/0476; B29C 67/222
USPC ........................ 264/45.1, 45.4, 46.1, 663, 664
See application file for complete search history.

(56) References Cited

U.S. PATENT DOCUMENTS

| | | | |
|---|---|---|---|
| 3,060,513 | A | 10/1962 | Klink et al. |
| 4,307,200 | A | 12/1981 | Lichter et al. |

(Continued)

FOREIGN PATENT DOCUMENTS

| | | |
|---|---|---|
| GB | 1358710 A | 7/1974 |
| JP | 2004195658 A | 7/2004 |

(Continued)

OTHER PUBLICATIONS

International Search Report for PCT Application No. PCT/US2014/015275 mailed Jun. 25, 2014.

(Continued)

*Primary Examiner* — Stella Yi
(74) *Attorney, Agent, or Firm* — Honigman Miller Schwartz & Cohn LLP; Anna M. Budde; Jonathan P. O'Brien

(57) ABSTRACT

Disclosed is a method for molding a foamed article, such as a midsole or outsole for footwear, in which first water, then a desired amount of thermoplastic polyurethane foam beads are placed in a compression mold in the shape of the article and the mold is brought to a peak temperature of from about 130° C. to about 180° C. over a period of from about 300 to about 1500 seconds, then cooled to from about 5° C. to about 80° C. over a period of from about 300 to about 1500 seconds within about 30 seconds after the peak temperature is reached. The foamed article made by the method has a density of from about 0.1 to about 0.45 g/cm³.

18 Claims, 1 Drawing Sheet

(51) Int. Cl.
*B29D 35/12* (2010.01)
*B29C 35/04* (2006.01)
*A43B 13/04* (2006.01)
*A43B 17/14* (2006.01)
*A43B 23/02* (2006.01)
*C08J 9/232* (2006.01)
*B29K 21/00* (2006.01)
*B29K 75/00* (2006.01)

(56) References Cited

U.S. PATENT DOCUMENTS

| | | | |
|---|---|---|---|
| 5,665,285 | A | 9/1997 | Hattori et al. |
| 6,635,203 | B2 | 10/2003 | Monaci |
| 6,759,443 | B2 | 7/2004 | Brant et al. |
| 6,878,753 | B1 | 4/2005 | Takemura et al. |
| 2008/0230956 | A1 | 9/2008 | Allmendinger et al. |
| 2010/0047550 | A1 | 2/2010 | Prissok et al. |
| 2010/0222442 | A1 | 9/2010 | Prissok et al. |
| 2011/0215497 | A1 | 9/2011 | McEvoy et al. |
| 2012/0036698 | A1 | 2/2012 | Guertin |

FOREIGN PATENT DOCUMENTS

| | | |
|---|---|---|
| KR | 20090026526 A | 3/2009 |
| WO | 9420568 A1 | 9/1994 |

OTHER PUBLICATIONS

PCT International Preliminary Report on Patentability for PCT/US2014/015275, dated Mar. 23, 2015, 18 pgs.

PCT International Search Report and Written Opinion for PCT/US2013/049561, dated Sep. 27, 2013.

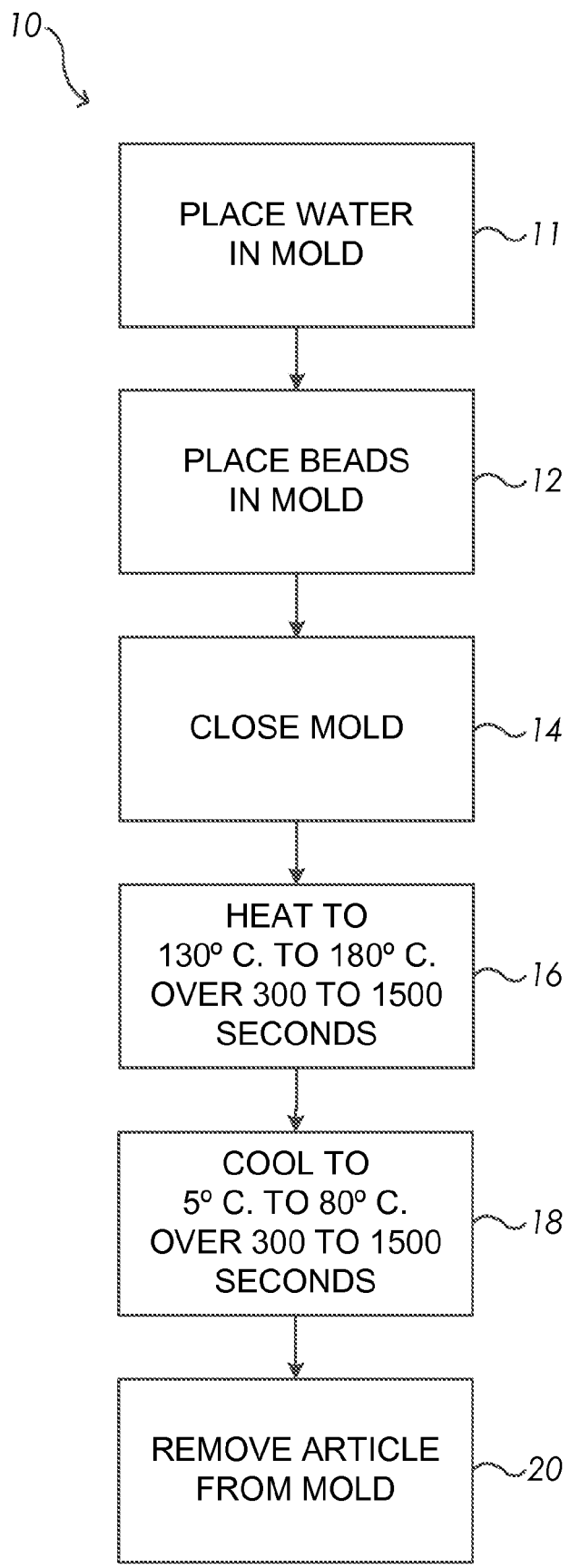

BEAD FOAM COMPRESSION MOLDING METHOD WITH IN SITU STEAM GENERATION FOR LOW DENSITY PRODUCT

FIELD OF THE INVENTION

The present invention relates to molding foamed articles, particularly for footwear.

INTRODUCTION TO THE DISCLOSURE

This section provides information helpful in understanding the invention but that is not necessarily prior art.

Thermoplastics are desirable as recyclable materials. However, thermoset materials can have properties better suited for some applications.

Brant et al., U.S. Pat. No. 6,759,443 describes polyurethane foam shoe soles made by foaming a polyurethane made from vinyl polymer-grafted polyoxyalkylene polyether. Polyethylene wax and polytetrafluoroethylene are added to improve abrasion resistance.

Takemura et al., U.S. Pat. No. 6,878,753 describes shoe soles and midsoles made of a thermoset polyurethane foam. The foam is made by a process comprising mixing a polyol solution, which is previously prepared by mixing a polyol, with a catalyst, water and urea, a chain extender, and an additive as occasion demands, with a polyisocyanate compound with stirring in a molding machine; and injecting the resulting mixture into a mold and foaming the mixture. The density of a molded article of the polyurethane foam is said to be 0.15 to 0.45 $g/cm^3$.

Fischer et al., WO 94/20568, describes thermoplastic polyurethane mini-pellet or bead foams with an average diameter of 1-20 millimeters. The polyurethanes are polyester- and polyether-based materials. The bead foams are molded under pressure and heated by introducing pressurized steam.

Prissok et al, US Patent Application Publication No. 2010/0047550 describes a hybrid material with a matrix of polyurethane and foamed particles of thermoplastic polyurethane embedded in the matrix. The hybrid material may be used for making shoe soles. The matrix polyurethane may be foamed during molding.

Prissok et al., US Patent Application Publication No. 2010/0222442 describes an expandable thermoplastic polyurethane including a blowing agent and having a Shore hardness of A 44 to A 84. Foams can be produced from expanded beads of the polyurethane by fusing them to one another in a closed mold with exposure to heat. Prissok et al. teach that the beads are charged to the mold, the mold is closed, and steam or hot air is introduced into the mold to further expand the beads and fuse them together. A foam made in this way is said to have a density in the range of from 8 to 600 g/L.

It has been found, however, that prior methods of molding foamed beads or minipellets can cause the beads to partially compress, which is undesirable in applications where lower density is desirable.

SUMMARY OF THE DISCLOSURE

This section provides a general summary of the invention.

Disclosed is a method for molding a foamed article, such as a midsole for footwear, in which first water and then a desired amount of thermoplastic polyurethane foam beads are placed in a compression mold, using 1 part by weight water per from about 8 to about 15 parts by weight thermoplastic polyurethane foam beads. After the water and the beads are loaded into the mold, the mold is closed, then brought to a peak temperature of from about 130° C. to about 180° C. over a period of from about 300 to about 1500 seconds, then cooled to from about 5° C. to about 80° C. over a period of from about 300 to about 1500 seconds within about 30 seconds after the peak temperature is reached. The foam beads may have a density of from about 0.01 to about 0.3 $g/cm^3$, and the molded article may have a density of from about 0.1 to about 0.45 $g/cm^3$.

The articles molded by this method have surprisingly low densities as compared to the densities for articles obtained using the prior known method of introducing steam into the mold to fuse the beads together.

The method may be used to make a component for an article of footwear such as a midsole, a component of a midsole such as a cushioning pad, a part of footwear upper such as a foam element in a collar, a sockliner or a part of a sockliner, or an outsole or a part of an outsole; foam padding in protective equipment such as shinguards, shoulder pads, chest protectors, masks, helmets or other headgear, knee protectors, and other protective equipment; padding for a padded strap, for example for a golf bag or shoulder bag; an element placed in an article of clothing between textile layers; or may be used for other known padding applications for protection or comfort, especially those for which weight of the padding is a concern. The invention further provides padded articles including such foam, padding, or cushioning components.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description that follows. It should be understood that the description and specific examples are intended for purposes of illustration only and are not intended to limit the scope of the present disclosure.

DRAWINGS

The drawing illustrates a selected embodiment described in the detailed description.

The FIGURE shows a flowchart of a method for molding thermoplastic polyurethane foam beads into an article, such as a component for an article of footwear or other article.

DETAILED DESCRIPTION

A detailed description of exemplary, nonlimiting embodiments follows.

In the method for molding thermoplastic polyurethane foam beads, water is first placed in the mold. The water is used in an amount of 1 part by weight water per from about 1.5 to about 20 parts by weight of the thermoplastic polyurethane foam beads placed in the mold after the water. During molding, when heat is applied to the mold the water evaporates to form steam. The amount of steam is limited by the amount of water introduced into the mold before adding the thermoplastic polyurethane foam beads. The limited amount of steam produced in this way provides shorter cycle times and better adhesion of the beads to one another in the center of the molded article as compared to molding without water in the mold. The limited amount of steam produced in this way also provides less energy consumption and better definition of character lines in the molded article as compared to using steam injected into the mold.

There are no particular requirements for the water in regard to its temperature going into the mold, although it should preferably be at ambient mold temperature or higher, so long as it is in its liquid state. In various embodiments, from about 5 to about 40 parts by weight water may be placed in the mold followed by from about 60 to about 100 parts by weight of thermoplastic polyurethane foam beads. In certain embodiments the water may be used in an amount of 1 part by weight water per from about 3 to about 12 parts by weight thermoplastic polyurethane foam beads.

After the water is charged to the mold, the thermoplastic polyurethane foam beads are placed in the mold. The thermoplastic polyurethane foam mini-pellets or beads may have a density of from about 0.01 to about 0.3 g/cm$^3$. In general, a lower density for the thermoplastic polyurethane foam beads allows a lower density for a product molded from the beads. In various embodiments, the foam beads may have a density equal to or less than about 0.3 g/cm$^3$ or equal to or less than about 0.1 g/cm$^3$. For example, the thermoplastic polyurethane foam beads may have a density of from about 0.03 to about 0.1 g/cm$^3$. The thermoplastic polyurethane foam beads are prepared from a thermoplastic polyurethane. The beads may be prepared using solely one thermoplastic polyurethane or may be prepared from a polymer blend of two or more thermoplastic polyurethanes. The beads may be integral foams.

The thermoplastic polyurethane from which the foam beads are prepared may have a melt index (also called a melt flow index or melt flow rate) of at least about 160 grams/10 min. (at 190° C., 21.6 kg) as measured according to ASTM D1238. In various embodiments, the melt index may be from about 160 to about 250 grams/10 min. (at 190° C., 21.6 kg) or from about 160 to about 220 grams/10 min. (at 190° C., 21.6 kg), in each case as measured according to ASTM D1238.

Thermoplastic polyurethanes can be produced via reaction of (a) diisocyanates with difunctional compounds reactive toward isocyanates. In general, the difunctional compounds have two hydroxyl groups (diols) and may have a molar mass of from 62 (the molar mass of ethylene glycol) to about 10,000, although difunctional compounds having other isocyanate-groups (e.g., secondary amine) may be used, generally in minor amounts, and a limited molar fraction of tri-functional and mono-functional isocyanate-reactive compounds may be used. Preferably, the polyurethane is linear. Including difunctional compounds with molar masses of about 400 or greater introduces soft segments into the polyurethane. An increased ratio of soft segments to hard segments in the polyurethane causes the polyurethane to become increasingly more flexible and eventually elastomeric. In certain embodiments, such as when the molded article is an outsole for an article of footwear, the beads may advantageously be prepared using a rigid thermoplastic polyurethane or combination of thermoplastic polyurethanes. In various other embodiments, such as when the molded article is a midsole for footwear, the beads may advantageously be prepared using an elastomeric thermoplastic polyurethane or a combination of elastomeric thermoplastic polyurethanes.

Suitable elastomeric thermoplastic polyurethanes include thermoplastic polyester-polyurethanes, polyether-polyurethanes, and polycarbonate-polyurethanes. Nonlimiting, suitable examples of these include, without limitation, polyurethanes polymerized using as diol reactants polyesters diols prepared from diols and dicarboxylic acids or anhydrides, polylactone polyesters diols (for example polycaprolactone diols), polyester diols prepared from hydroxy acids that are monocarboxylic acids containing one hydroxyl group, polytetrahydrofuran diols, polyether diols prepared from ethylene oxide, propylene oxide, or combinations of ethylene oxide and propylene oxide, and polycarbonate diols such as polyhexamethylene carbonate diol and poly(hexamethylene-co-pentamethylene)carbonate diols. The elastomeric thermoplastic polyurethane may be prepared by reaction of one of these polymeric diols (polyester diol, polyether diol, polylactone diol, polytetrahydrofuran diol, or polycarbonate diol), one or more polyisocyanates, and, optionally, one or more monomeric chain extension compounds. Chain extension compounds are compounds having two or more functional groups, preferably two functional groups, reactive with isocyanate groups. Preferably the elastomeric thermoplastic polyurethane is substantially linear (i.e., substantially all of the reactants are di-functional).

Nonlimiting examples of polyester diols used in forming the elastomeric thermoplastic polyurethane include those prepared by the condensation polymerization of dicarboxylic compounds, their anhydrides, and their polymerizable esters (e.g. methyl esters) and diol compounds. Preferably, all of the reactants are di-functional, although small amounts of mono-functional, tri-functional, and higher functionality materials (perhaps up to a few mole percent) can be included. Suitable dicarboxylic acids include, without limitation, glutaric acid, succinic acid, malonic acid, oxalic acid, phthalic acid, hexahydrophthalic acid, adipic acid, maleic acid, anhydrides of these, and mixtures thereof. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred embodiment, the carboxylic acid includes adipic acid and the diol includes 1,4-butanediol. Typical catalysts for the esterification polymerization are protonic acids, Lewis acids, titanium alkoxides, and dialkyl tin oxides.

Hydroxy carboxylic acid compounds such as 12-hydroxy stearic acid may also be polymerized to produce a polyester diol. Such a reaction may be carried out with or without an initiating diol such as one of the diols already mentioned.

Polylactone diol reactants may also be used in preparing the elastomeric thermoplastic polyurethanes. The polylactone diols may be prepared by reacting a diol initiator, e.g., a diol such as ethylene or propylene glycol or another of the diols already mentioned, with a lactone. Lactones that can be ring opened by an active hydrogen such as, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these can be polymerized. The lactone ring can be substituted with alkyl groups of 1-7 carbon atoms. In one preferred embodiment, the lactone is ε-caprolactone. Useful catalysts include those mentioned above for polyester synthesis. Alternatively, the reaction can be initiated by forming a sodium salt of the hydroxyl group on the molecules that will react with the lactone ring.

In preparing a polyether diol, a diol initiator such as ethylene glycol, propylene glycol, 1,4-butanediol, or another of the diols mentioned above is reacted with an oxirane-containing compound to produce a polyether diol. The oxirane-containing compound is preferably an alkylene oxide or cyclic ether, and more preferably it is a compound selected from ethylene oxide, propylene oxide, 1-butene oxide, tetrahydrofuran, and combinations of these. Other useful cyclic ethers that may be polymerized include, without limitation, 1,2-cyclohexene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The polyether polymerization is typically base-catalyzed. The polymerization may be carried out, for example, by charging the hydroxyl-functional initiator and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition.

Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonates may be prepared by polycondensation of aliphatic diols with dialkyl carbonates, (such as diethyl carbonate), cyclic glycol carbonates (such as cyclic carbonates having five- and six-member rings), or diphenyl carbonate, in the presence of catalysts like alkali metal, tin catalysts, or titanium compounds. or diphenyl carbonate. Another way to make aliphatic polycarbonates is by ring-opening polymerization of cyclic aliphatic carbonates catalyzed by organometallic catalysts. The polycarbonate diols can also be made by copolymerization of epoxides with carbon dioxide. Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol, such as the polymeric polyester diols and polyether diols described above, that are used in making an elastomeric thermoplastic polyurethane synthesis preferably have a number average molecular weight (determined for example by the ASTM D-4274 method) of from about 300 to about 8,000, or from about 300 to about 5000, or from about 300 to about 3000.

The synthesis of a elastomeric thermoplastic polyurethane may be carried out by reacting one or more of the polymeric diols, one or more compounds having at least two (preferably two) isocyanate groups, and, optionally, one or more chain extension agents. The elastomeric thermoplastic polyurethanes are preferably linear and thus the polyisocyanate component preferably is substantially di-functional. Useful diisocyanate compounds used to prepare the elastomeric thermoplastic polyurethanes, include, without limitation, methylene bis-4-cyclohexyl isocyanate, cyclohexylene diisocyanate (CHDI), isophorone diisocyanate (IPDI), m-tetramethyl xylylene diisocyanate (m-TMXDI), p-tetramethyl xylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), 2,4-tolylene ("toluene") diisocyanate and 2,6-tolylene diisocyanate (TDI), 2,4'-methylene diphenyl diisocyanate (MDI), 4,4'-methylene diphenyl diisocyanate (MDI), o-, m-, and p-xylylene diisocyanate (XDI), 4-chloro-1,3-phenylene diisocyanate, naphthylene diisocyanates including 1,2-naphthylene diisocyanate, 1,3-naphthylene diisocyanate, 1,4-naphthylene diisocyanate, 1,5-naphthylene diisocyanate, and 2,6-naphthylene diisocyanate, 4,4'-dibenzyl diisocyanate, 4,5'-diphenyldiisocyanate, 4,4'-diisocyanatodibenzyl, 3,3'-dimethoxy-4,4'-biphenylene diisocyanate, 3,3'-dimethyl-4,4'-biphenylene diisocyanate, 1,3-diisocyanatobenzene, 1,4-diisocyanatobenzene, and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400 g/mol. Alcohols and amines are preferred in some embodiments. Typical examples of useful diols that are used as polyurethane chain extenders include, without limitation, 1,6-hexanediol, cyclohexanedimethanol (sold as CHDM by Eastman Chemical Co.), 2-ethyl-1,6-hexanediol, 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, neopentyl glycol, dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl)ether; 3-hydroxy-2,2-dimethylpropyl 3-hydroxy-2,2-dimethylpropanoate; and mixtures thereof. Suitable diamine extenders include, without limitation, p-phenylenediamine, m-phenylenediamine, benzidine, 4,4'-methylenedianiline, 4,4'-methylenebis (2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to the above-described di-functional extenders, a small amount of tri-functional extenders such as trimethylolpropane, 1,2,6-hexanetriol and glycerol, and/or mono-functional active hydrogen compounds such as butanol or dimethyl amine, may also be present. The amount of tri-functional extenders and/or mono-functional compounds employed would preferably be a few equivalent percent or less based on the total weight of the reaction product and active hydrogen containing groups employed.

The reaction of the polyisocyanate(s), polymeric diol(s), and, optionally, chain extension agent(s) is typically conducted by heating the components, generally in the presence of a catalyst. Typical catalysts for this reaction include organotin catalysts such as stannous octoate or dibutyl tin dilaurate. Generally, the ratio of polymeric diol, such as polyester diol, to extender can be varied within a relatively wide range depending largely on the desired hardness of the elastomeric thermoplastic polyurethane. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 25% to about 65% by weight of the elastomeric thermoplastic polyurethane, and preferably from about 25% to about 50% by weight of the elastomeric thermoplastic polyurethane.

One nonlimiting example of commercially available elastomeric thermoplastic polyurethanes having a melt flow index of from about 160 to about 220 grams/10 min. (at 190° C., 21.6 kg) suitable for making the thermoplastic polyurethane foam beads is Elastollan® SP9213 (melt flow index of 200 g/10 min. (at 190° C., 21.6 kg)), which is available from BASF Polyurethanes GmbH.

A thermoplastic polyurethane that is more rigid may be synthesized in the same way but with a lower content of the polymeric diol segments. A rigid thermoplastic polyurethane may, for example, include from about 0 to about 25 percent by weight of the polyester, polyether, or polycarbonate diol segments. Synthesis of rigid polyurethanes is well-known in the art and described in many references. Rigid thermoplastic polyurethanes having a melt index of at least about 160 grams/10 min. (at 190° C., 21.6 kg) as measured according to ASTM D1238 are commercially available and include those sold under the trademark Isoplast® ETPU by Lubrizol Corp., Wickliffe, Ohio.

The thermoplastic polyurethane foam beads may be made from the elastomeric thermoplastic polyurethane by a method as disclosed in Fischer et al., WO 94/20568 and Prissok et al, US Patent Application Publications No. US 2010/0222442 and 2010/0047550, each of which are incorporated herein in its entirety by reference. The flexible polyurethane foams made by such a process preferably have a proportion of open cells in accordance with DIN ISO 4590 of greater than 85%, particularly preferably greater than 90%.

The thermoplastic polyurethane foam beads may have a broad range of shapes, including generally spherical, cylindrical ellipsoidal, cubic, rectangular, and other generally polyhedral shapes as well as irregular or other shapes, including those having circular, elliptical, square, rectangular or other polygonal cross-sectional outer perimeter shapes or irregular cross-sectional shapes with or without uniform widths or diameters along an axis. "Generally" is used here to indicate an overall shape that may have imperfections and irregularities, such as bumps, dents, imperfectly aligned edges, corners, or sides, and so on. In various embodiments, the thermoplastic polyurethane foam beads may preferably be generally spherical or ellipsoidal. In the case of non-spherical beads, for example ellipsoidal beads, the largest major diameter of a cross-section taken perpendicular to the major (longest) axis of the ellipsoid. The thermoplastic polyurethane foam beads may preferably have a diameter of from about 0.5 mm to about 1.5 cm. Ellipsoidal beads may be from about 2 mm to about 20 mm in length and from about 1 to about 20 mm in diameter. Each individual bead may be, for example, from about 20 to about 45 mg in weight. The foamed particles preferably have a compact outer skin. Here, reference to a compact skin means that the foam cells in the outer region of the foamed particles are smaller than those in the interior. Particular preference is given to the outer region of the foamed particles having no pores.

Referring now to the FIGURE, a process 10 of preparing a molded article from thermoplastic polyurethane foam beads has a step 11 in which water is placed in a mold and a step 12 in which a desired amount of the thermoplastic polyurethane foam beads are placed in the compression mold. The water and foamed beads may be placed in the mold when the water, foamed beads, and the mold are at a temperature below about 80° C. Preferably, the temperatures of the mold, the water, and the foamed beads are at ambient temperature (about 5-27° C.), although as mentioned the temperatures of each may be higher, up to perhaps 80° C. In step 14 the mold is closed. Once the mold is closed a locking pin may be inserted to keep the mold closed. With the mold closed it can be heated, e.g. by shuttling the mold to the hot side of the press. A minimum pressure to close (and keep closed) the mold may depend, for example, on the mold surface area and volume of beads being compressed in the mold cavity. The quantity of beads inserted into the mold can be changed to vary the density of the molded product; the quantity of water used in the mold is dependent on the quantity of beads used, as has already been observed. As a nonlimiting example, 5 grams of water is added to a mold, followed by 60 grams of beads, then the mold is closed and its contents are molded in a mold with a volume of 175 cm$^3$ to provide a molded article with a bulk density of about 0.3 g/cm$^3$. The article may contain both fused beads and air gaps.

In step 16, the mold is brought to a peak temperature that is in the range of from about 130° C. to about 180° C. over a period of from about 300 to about 1500 seconds. In general, a longer time may be used for heating a thicker part to mold the part. Thus, a thicker part may be brought to the peak molding temperature over a longer period of time compared to the time in which a thinner part is brought to the peak molding temperature. In various embodiments, the peak molding temperature is in the range of from about 140° C. to about 170° C. In various embodiments, the mold is brought to the peak temperature over a period of from about 300 to about 1200 seconds or from about 300 to about 900 seconds. A desired skin thickness may be achieved by selection of the maximum heating temperature within the temperature range. Skin thickness may be selected to alter cushioning and feel of a molded midsole as used in an article of footwear. Skin thickness is dependent on the beads used. The skin thickness on a bead may be about 10 micrometers. The skin thickness on a molded part may be at least about 20 micrometers. A molding temperature of about 130° C. produces a thinner skin than does a molding temperature of about 180° C. In various embodiments, the peak temperature is selected to produce a skin thickness of from about 10 to about 200 micrometers.

In step 18 the mold is then cooled to a temperature of from about 5° C. to about 80° C. over a period of from about 300 to about 1500 seconds. Cooling is typically carried out by moving the mold to the cold side of the compression molding press between two cold plates. In general, a longer time may be used for cooling a thicker part. Thus, a thicker part may be cooled over a longer period of time compared to the time in which a thinner part is cooled to the same temperature. In various embodiments, the part may be cooled over a period of from about 300 to about 1200 seconds or over a period of from about 300 to about 900 seconds. In various embodiments, the cooling step 18 is begun as soon as a peak temperature is reached in step 16. The cooling step 18 may be begun within 30 seconds, or within 10 seconds, or from about 0 to about 5 seconds, or immediately after the peak temperature is reached in step 16. The mold and molded article may be cooled a rate of from about 0.09 to about 0.55° C./second.

In step 20 the molded article is removed from the mold.

The molded article may have a density of less than about 0.45 g/cm, preferably less than about 0.4 g/cm$^3$, more preferably less than about 0.35 g/cm$^3$. In various embodiments, the molded article may have a density of from about 0.1 to about 0.45 g/cm$^3$, or a density of from about 0.1 to about 0.4 g/cm$^3$, or a density of from about 0.1 to about 0.35 g/cm$^3$.

The articles molded by the disclosed process have lower densities and are lighter in weight as compared to articles molded from the thermoplastic polyurethane foam beads using steam to heat the mold contents. While the method now disclosed of using a small amount of water in the mold to generate steam results in the beads shrinking and a higher part density in comparison to fusing the beads in the mold using only hot air, heating with hot air takes substantially longer because the heat transfer with hot air is substantially slower.

The molded article also has better definition of character lines or molded-in designs as compared to articles molded from the thermoplastic polyurethane foam beads using steam to heat the mold contents. Examples of character lines and designs are letters, symbols, undercuts, and bite lines. Such character lines may have depths of from about 0.1 cm to about 10 cm.

The molded article may be incorporated as cushioning into other articles. As nonlimiting examples, the molded article may be a foam element in footwear, such as a part of a footwear upper, such as a foam element in a collar, a foam midsole or a part of a midsole, or an outsole or a part of an outsole; foam padding in shinguards, shoulder pads, chest protectors, masks, helmets or other headgear, knee protectors, and other protective equipment; padding in a padded strap, for example for a golf bag or shoulder bag; an element placed in an article of clothing between textile layers; or may be used for other known padding applications for protection or comfort, especially those for which weight of the padding is a concern.

In various embodiments, the molded article is a midsole for an article of footwear. A midsole provides cushioning in the footwear. A midsole should be durable but also preferably adds as little weight as possible to the footwear while still cushioning to the desired degree. A midsole also should be able to be bonded to an outsole, an upper, or any other components (e.g., a shank, an airbag, or decorative components) in making an article of footwear.

In other embodiments, the molded article is an outsole for an article of footwear. An outsole may be molded using thermoplastic polyurethane foam beads made with a rigid thermoplastic polyurethane.

The invention is further described in the following examples. The examples are merely illustrative of various embodiments. All parts are parts by weight unless otherwise noted.

Example of the Invention

Five grams of water were placed in a compression mold fitted with a mold for a footwear midsole. The mold was then filled with 60 g of thermoplastic polyurethane foam beads obtained from BASF Corporation, Wyandotte, Mich. (10 mm in length±2 mm, diameter of 0.5 mm±0.2 mm, density of 0.28 to 0.3 g/cm$^3$). The mold was closed, and the mold was then heated from about 18-22° C. to a temperature of 160° C. in 600 seconds between hot plates. The mold was immediately cooled to a temperature of 8° C. over a period of 600 seconds between cold plates. The molded midsole was removed from the mold. The density of the molded midsole was 0.28-0.3 g/cm$^3$.

Comparative Example

A comparative example was prepared using steam heating as disclosed in Prissok et al., US Patent Application Publication No. 2010/0222442. In this example, 120 grams of beads like those used in the Example of the Invention were place in a steam chest mold fitted with a midsole mold as in the Example of the Invention and the mold was closed. The beads were heated using steam injected into the mold from room temperature (about 22° C.) to about 120° C. in 1-2 minutes, then cooled to about 22° C. in about 2-3 minutes. The density of the molded midsole was 0.35 g/cm$^3$.

The examples show that the Example of the Invention produced a lower density than that of the part prepared using the comparative steam chest molding method.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for molding a foamed article, comprising:
placing an amount of water in a compression mold in the shape of an article;
then placing a desired amount of thermoplastic polyurethane foam beads in the compression mold, wherein the thermoplastic polyurethane foam beads have a density of from about 0.01 to about 0.3 g/cm$^3$ and wherein 1 part by weight water per from about 1.5 to about 20 parts by weight of the thermoplastic polyurethane foam beads is used;
closing the mold;
bringing the mold to a peak temperature of from about 130° C. to about 180° C. over a period of from about 300 to about 1500 seconds;
cooling the mold to a temperature of from about 5° C. to about 80° C. over a period of from about 300 to about 1500 seconds within about 30 seconds after the peak temperature is reached; and
removing the article.

2. A method according to claim 1, wherein 1 part by weight water per from about 3 to about 12 parts by weight of the thermoplastic polyurethane foam beads is used.

3. A method according to claim 1, wherein the peak mold temperature is from about 140° C. to about 170° C.

4. A method according to claim 1, wherein the thermoplastic polyurethane foam beads have a density of from about 0.01 to about 0.1 g/cm$^3$.

5. A method according to claim 1, wherein the thermoplastic polyurethane foam beads comprise a thermoplastic polyurethane with a melt flow index of at least about 160 grams/10 min. (at 190° C., 21.6 kg) as measured according to ASTM D1238.

6. A method according to claim 1, wherein the thermoplastic foam beads comprise an elastomeric thermoplastic polyurethane with a melt flow index of from about 180 to about 250 grams/10 min. (at 190° C., 21.6 kg) as measured according to ASTM D1238.

7. A method according to claim 1, wherein the thermoplastic polyurethane foam beads comprise an elastomeric thermoplastic polyurethane selected from the group consisting of thermoplastic polyester-polyurethanes, polyether-polyurethanes, and polycarbonate-polyurethanes.

8. A method according to claim 1, wherein the thermoplastic polyurethane foam beads comprise at least one of an elastomeric thermoplastic polyester-polyurethane and an elastomeric thermoplastic polyether-polyurethane.

9. A method according to claim 8, wherein the thermoplastic polyurethane foam beads comprise at least an elastomeric thermoplastic polyether-polyurethane that is a reaction product of diphenylmethane diisocyanate.

10. A method according to claim 1, wherein the thermoplastic polyurethane foam beads have a diameter of from about 0.5 mm to about 1.5 cm.

11. A method according to claim 1, wherein the thermoplastic foam beads have a compact outer skin.

12. A method according to claim 1, wherein the thermoplastic foam beads and the mold are each at a temperature below about 80° C.

13. A method according to claim 1, wherein the amount of the thermoplastic polyurethane foam beads placed in the mold is selected to provide a foamed article having a density of from about 0.1 to about 0.45 g/cm$^3$.

14. A method according to claim 1, wherein the mold is brought to the peak temperature over a period of from about 300 to about 1200 seconds.

15. A method according to claim 1, wherein the peak temperature is selected to produce a skin thickness of from about 9 to about 200 micrometers.

16. A method according to claim 1, wherein the mold is cooled over a period of from about 300 to about 1200 seconds.

17. A method according to claim 1, wherein the mold cooling step is begun immediately after the peak temperature is reached.

18. A method according to claim 1, wherein the mold is cooled at a rate of from about 0.09 to about 0.55° C./second.

* * * * *